United States Patent [19]

Cobb

[11] 3,928,649

[45] Dec. 23, 1975

[54] DIETARY DAIRY DESSERT MIX AND FROZEN PRODUCT THEREFROM

[76] Inventor: Edwin W. Cobb, 21 Holland Drive, Wakefield, R.I. 02879

[22] Filed: Sept. 18, 1974

[21] Appl. No.: 506,993

[52] U.S. Cl................................. 426/565; 426/804
[51] Int. Cl.²........................................... A23G 9/02
[58] Field of Search ........... 426/164, 380, 804, 213, 426/565

[56] References Cited
UNITED STATES PATENTS

| | | | |
|---|---|---|---|
| 2,876,104 | 3/1959 | Blindzius | 426/164 |
| 3,475,181 | 10/1969 | Kracauer | 426/164 |
| 3,510,316 | 5/1970 | Decker | 426/164 |
| 3,702,768 | 11/1972 | Finucane | 426/164 |

*Primary Examiner*—Jeanette M. Hunter

[57] ABSTRACT

An ice cream-like frozen dietary dairy dessert characterized by low fat, sodium and calorie content, and a mix for preparing the dessert. The mix is suitable for homogenization and pasteurization with anhydrous milk fat and water and thereafter for freezing to form the dessert, and contains polyhydric alcohol selected from sorbitol or a mixture of sorbitol and mannitol, non-fat milk solids and a food quality stabilizer. The amount of polyhydric alcohol in the frozen product is 8–18 percent by weight and the amounts of anhydrous milk fat and non-fat milk solids are 2–5 percent by weight and 10–15 percent by weight, respectively.

9 Claims, No Drawings

DIETARY DAIRY DESSERT MIX AND FROZEN PRODUCT THEREFROM

BACKGROUND OF THE INVENTION

This invention relates to ice cream-like dietary dairy dessert products and to dry mixes for preparing such products.

A variety of dietary dessert products are known but apparently none have gained wide acceptance by the average consumer seeking a dietary dessert, or by hospitals. In some cases the dessert products are frozen in attempts to imitate ice cream. Nevertheless, so far as is known, the properties of quality ice cream have never been adequately duplicated in a dietary dairy dessert product. For example, although such imitation ice creams are sugarless and may even have a consistency and taste approximating that of conventional ice cream, the products are deficient in other respects, such as too high sodium, fat and caloric content, appearance, odor, color, and stability. Furthermore, artificial sweeteners such as the cyclamates and saccharin have very little food value, are suspect as causative agents in various health problems, or do not contribute significantly to control of solids content and texture of product.

A frozen dairy dessert is therefore needed which can satisfy most dietary restrictions, particularly with respect to low sodium, calorie and fat level, while essentially duplicating the appearance, texture, flavor and other properties of a good quality ice cream product.

OBJECTS AND SUMMARY

Accordingly, an object of the invention is to provide a new and improved mix suitable for use in preparing a frozen dietary dairy dessert which duplicates most of the qualities of ice cream but which is sugarless and which has low sodium, fat and calorie content.

Another object is to provide a frozen dietary dairy dessert which will meet most dietary restrictions, particularly as to low sodium and fat content, but which nevertheless has substantial food value.

These and other objects, features and advantages of the invention will be apparent from the specification which follows.

In brief outline, the foregoing and other objects of the invention are satisfied in a mix which is suitable for homogenization and pasteurization with an anhydrous milk fat and water and thereafter for freezing to form a frozen dietary dairy dessert, such mix containing as essential ingredients sorbitol or a mixture of sorbitol and mannitol in amounts effective to provide the requisite solids content, sweetness level and texture; non-fat milk solids; and a low sodium content, food quality stabilizer. The mix can be packaged and sold with directions for mixture with anhydrous milk fat, water and, desirably, a food flavor and color, and the combination then frozen to form a dietary dairy dessert which is very difficult to distinguish from good quality, conventional ice cream.

DETAILED DESCRIPTION

A primary aspect of the present invention is the discovery that sorbitol or a mixture of sorbitol and mannitol when combined in certain amounts with non-fat milk solids and a low sodium content food quality stabilizer, is suitable for subsequent homogenization and pasteurization with anhydrous milk fat and water to form a frozen dairy dessert. The frozen product satisfies dietary restrictions and also closely appproximates the characteristics of a good quality ice cream.

The sorbitol or mannitol are available and can be utilized in a crystalline, powder or solution form. Generally it is most convenient to use the sorbitol in solution since this form facilitates subsequent homogenization with other ingredients of the mix. A suitable commercial sorbitol solution is one containing 70 percent by weight D-sorbitol but other percentage aqueous solutions can also be utilized. Whether crystalline sorbitol or a sorbitol solution is utilized, the amount of sorbitol in the mix, when sorbitol is used alone, should be such as that to provide in the resulting frozen dessert the equivalent of about 14–18 percent by weight of a 70 percent by weight aqueous sorbitol solution. The amount of sorbitol solids in the mix can be readily calculated from the batch size for the final, frozen dessert product and other ingredients to be included therein, such as the anhydrous milk fat, non-fat milk solids, stabilizer and/or emulsifier, water, food flavoring and color, as will be apparent from the formulations set forth below.

When a mixture of sorbitol and mannitol is utilized, either of these polyhydric alcohols may be crystalline or in the form of an aqueous solution. Generally, it is convenient to use a sorbitol solution and crystalline mannitol. The mixture of sorbitol and mannitol is preferred to sorbitol alone in order better to build up the solids content of the mix and frozen product while also maintaining good sweetness level and texture. When such sorbitol-mannitol combination is used, the mix should contain amounts of each as to provide the equivalent in the final, frozen dessert product of about 5–15 percent by weight of a 70 percent by weight aqueous sorbitol solution and about 3–15 percent by weight mannitol solids. Whether sorbitol alone or a mixture of sorbitol and mannitol is utilized in the mix, it has been found that the total amount of these polyhydric alcohols in the frozen product should be in the range of about 8–15 percent by weight, of which the amount of one of the polyhydric alcohols should be at least 14 percent by weight on the same basis. Absent these amounts the final frozen product does not exhibit sufficient sweetness and texture.

The second ingredient of the mix and frozen dessert product is non-fat milk solids. A variety of such products are available commercially, a preferred product being "Skil," sold by Sheffield Chemical of Norwich, N.Y., a division of National Dairy Products Corporation. This commercial product is especially suitable because of its low sodium content, of the order of about 0.03 grams per 100 grams as compared with about 0.57 grams per 100 grams in other non-fat dry milk products. This ingredient has high food value particularly with respect to protein, lactose, mineral salts other than sodium salts, and vitamins. An amount of non-fat milk solids in the mix effective to provide about 10–15 percent by weight in the final frozen product will be suitable.

The third essential ingredient in the mix is a low sodium content, food quality stabilizer. A product of this type is "Logar" sold by National Pectin Products, Division of Patco Products Co. Desirably, a food quality emulsifier should be in the mix and should also have a low sodium content. One such emulsifier is a commercially available product sold as "NPL-31 Emulsifier" also by National Pectin Products. These products may be obtained separately or pre-mixed. In formulations where the sorbitol predominates over the mannitol, little or no emulsifier will be required since sorbitol itself provides emulsifying properties.

Low salt content, food quality additives are also known which are both stabilizers and emulsifiers. Such additives include cellulose gum, calf gelatin (for example, a commercial product having 250 bloom) and carrageenin (also known as "Irish moss"). Other such combination stabilizer-emulsifiers include gelatin, egg white, locust bean gum, gum acacia, the alginates, carob gum, gum karaya, gum tragacanth, agar agar, and synthetics such as carboxymethyl cellulose, and the edible aliphatic fatty acid monoesters and mono-acid glycerides disclosed in U.S. Pat. Nos. 2,821,480 and 3,124,464.

The amount of stabilizer and/or emulsifier in the mix is not critical but generally an amount effective to provide in the final frozen product about 0.2–2.0 percent by weight will be effective. When separate stabilizers and emulsifiers are utilized, each may be present in the mix in amounts effective to provide in the final frozen product about 0.1–1.0 percent by weight.

The mix is prepared in any convenient manner known in the frozen dairy products art. For example the stabilizer may be dissolved in the water and the powders or crystalline materials added. Alternatively, the stabilizer and/or emulsifier may first be thinned out by the addition of portions of water or the sorbitol solution or mixture of sorbitol solution and mannitol, in proportions of about five parts of sorbitol solution or sorbitol solution-mannitol per part of stabilizer and/or emulsifier. The balance of the sorbitol and mannitol may then be added, followed by the non-fat milk solids. Any suitable mixing device may be utilized for such purpose. The resulting product may be packaged in any suitable manner with directions for admixture with anhydrous milk fat, water, and food quality flavoring and color. Pasteurization, homogenization and freezing instructions will normally be included in such mixing directions.

The anhydrous milk fat component of the final frozen product is a known material and commercially available from several sources. The removal of water in its manufacture is significant to the present invention because such removal is usually accompanied by demineralization, so that the milk fat is low in sodium content or the sodium is substantially absent.

Alternatively, the frozen dietary dessert of the invention may be prepared directly for distribution and sale. Conventional ice cream manufacturing methods may be utilized. In such case the stabilizer and/or emulsifier again may be thinned out by the addition of portions of the water or sorbitol solution, or mixture of sorbitol solution and mannitol, followed by the addition of the remaining water. The balance of the sorbitol solution and mannitol is then added followed by the non-fat milk solids and the anhydrous milk fat ingredients, with suitable agitation to effect good mixing. This mixture is first pasteurized in a conventional vessel, such as an ice cream pasteurizer of about 200 gallons capacity. Pasteurization at 160°F. for about 30 minutes usually is effective to kill undesirable bacteria. The mixture is thereafter homogenized in the same or separate vessel in order to emulsify the milk fat component. Conventional ice cream homogenizers may be used for this purpose and homogenization is best conducted in two stages at an elevated temperature, e.g., about 160°F. The first stage is at a pressure of 500 lbs. per square inch and the second stage is at a pressure of 2,000 lbs. per square inch. The homogenized mixture is then fast-cooled to about 40°F. It is preferred that the mixture thereafter be aged in a holding vat under agitation at about 37°–40°F. for 8–15 hours, for example, overnight. The aging step enhances the bloom and texture of the product.

During or at any point after homogenization, food flavoring and color may be added in minor amounts, of the order of about 0.25–10 ounces per five gallons of mix. The product is then frozen. In one suitable batch freezing technique, about 5 gallons of mix is cooled to a temperature of about 19°F. to make about 9 gallons of frozen product. However, conventional continuous freezing processes may be utilized if desired. Any flavors or colors which do not materially increase the calorie, sodium and fat content of the mix may be used. Thus, the frozen product can be flavored with vanilla, strawberry, coffee or lemon chiffon, but usually not with chocolate since chocolate is a non-dietary additive. If desired, additives for improving increased volume upon whipping and chilling and ease of melting in the mouth may be utilized, such as the additives disclosed in U.S. Pat. No. 3,702,768 and the glucose polymers of U.S. Pat. No. 2,876,104.

The following examples are intended as further illustration of the invention but are not necessarily limitative thereof extent as set forth in the claims. All parts and percentages are by weight unless otherwise indicated.

EXAMPLE 1

A frozen dietary dairy dessert product of 29.4 percent solids content was prepared from the following ingredients, the ingredients being admixed in approximately the sequence indicated:

|  | wt. % |
|---|---|
| water | 67.6 |
| sorbitol (70% aqueous solution) | 10.0 |
| mannitol (crystalline) | 5.0 |
| non-fat milk solids - "Skil" | 14.0 |
| anhydrous milk fat[1] | 3.0 |
| "Logar" stabilizer | 0.2 |
| "NPL-31" emulsifier | 0.2 |
|  | 100.0 |

[1] A commercially available product having not less than 99.8% milk fat, not more than 0.1% water, copper content not more than 0.1 ppm., peroxide value of not more than 0.5 milliequivalents per kg. fat, and free fatty acid of not more than 0.3% (as oleic acid).

The product was prepared by adding the stabilizer and emulsifier to enough of the sorbitol and mannitol to provide a 1:5 proportion of stabilizer-emulsifier to mannitol-sorbitol solution. The resulting mixture was then completely dissolved in the water. The remaining amount of sorbitol solution and mannitol was then admixed into the solution, followed by the non-fat milk solids and anhydrous milk fat components. This mixture was pasteurized at about 160°F. for 30 minutes, and homogenized at about the same temperature in two stages, the first stage being at a pressure of about 500 lbs. per square inch and the second stage at a pressure of 2,000 lbs. per square inch. The product was then rapidly cooled to about 40°F., food flavoring and color were added, and the product was aged in a refrigerated vat under fast agitation and at a temperature of about 37°–40°F. Aging was continued overnight.

Organoleptic tests indicated that the resulting frozen product had fine body, texture and excellent flavor.

The product could not easily be distinguished from good quality ice cream. A four ounce serving of the produce supplied only 90 calories, 34 percent less calories than conventional ice cream. The product was 97 percent fat free as compared with 12 percent milk fat ice cream on a 100 gram basis as follows:

TABLE I

|  | Ice Cream (12% Milk Fat) |  | Product of Invention |  |
|---|---|---|---|---|
| Calories | 206 |  | 136 |  |
| Protein | 3.8 | g. | 4.7 | g. |
| Carbohydrate | 21 | g. | 23 | g. |
| Fat | 12 | g. | 3 | g. |
| Calcium | 122 | mg. | 159 | mg. |
| Sodium | 68 | mg. | 5.7 | mg. |
| Iron | 0.12 | mg. | 0.10 | mg. |
| Potassium | 201 | mg. | 282 | mg. |

Following are other formulations which are useful in preparing frozen desserts of the invention, by the process substantially as described in Example 1 and with essentially the same excellent results.

| Example 2 | wt. % |
|---|---|
| Sorbitol (70% solution) | 18.00 |
| Non-Fat milk solids | 14.00 |
| Anhydrous milk fat | 2.50 |
| Cellulose Gum-Stabilizer and Emulsifier | .10 |
| Example 3 |  |
| Sorbitol (70% solution) | 16.00 |
| Non-Fat milk solids | 13.00 |
| Anhydrous milk fat | 3.00 |
| Calf gelatin - stabilizer and emulsifier (250 bloom) | .50 |
| Example 4 |  |
| Sorbitol (70% solution) | 15.00 |
| Non-Fat milk solids | 13.50 |
| Anhydrous milk fat | 4.00 |
| Carrageenin - stabilizer and emulsifier | .03 |
| Example 5 |  |
| Sorbitol (70% solution) | 8.00 |
| Mannitol (Crystalline) | 7.00 |
| Non-Fat milk solids | 13.00 |
| Anhydrous milk fat | 5.00 |
| Calf gelatin - stabilizer and emulsifier (250 bloom) | .50 |
| Example 6 |  |
| Sorbitol (70% solution) | 10.00 |
| Mannitol (crystalline) | 4.00 |
| Non-Fat milk solids | 12.50 |
| Anhydrous milk fat | 6.00 |
| Carrageenin - stabilizer and emulsifier | .03 |

It will be apparent that although a preferred embodiment of the mix and frozen dessert of the invention is an ice cream-like product, various other embodiments are included within the scope of the invention, such as whipped cream-like products, custards, sherbets, and the like.

While the invention has been illustrated and described in what are considered to be the most practical and preferred embodiments, it will be recognized that many variations are possible and come within the scope thereof, the appended claims therefore being entitled to a full range of equivalents.

I claim:

1. A mix suitable for homogenization and pasteurization with anhydrous milk fat and water and thereafter for freezing to form a frozen dietary dairy dessert characterized by low fat, sodium and calorie content, said mix comprising:

a. a polyhydric alcohol component selected from: (i) sorbitol in an amount effective to provide in said frozen dessert the equivalent of about 14–18 percent by weight of a 70 percent by weight aqueous sorbitol solution, or (ii) a mixture of sorbitol and mannitol in an amount effective to provide in said frozen dessert the equivalent of about 5–15 percent by weight of a 70 percent by weight aqueous sorbitol solution and about 3–15 percent by weight mannitol, of which the amount of one of said polyhydric alcohols is at least 14 percent by weight;

b. non-fat milk solids in an amount effective to provide about 10–15 percent by weight thereof in said frozen dessert; and c. an effective amount of a low salt content, food quality stabilizer.

2. A mix as in claim 1 wherein said stabilizer is a type which requires no emulsifier.

3. A mix as in claim 1 wherein said stabilizer requires a separate emulsifier and an effective amount of a low sodium content, food quality emulsifier is further provided in said mix.

4. A mix as in claim 1 further including flavoring and a food color.

5. A dietary dairy dessert characterized by low fat, sodium and calorie content, comprising a pasteurized, homogenized and frozen mixture of:

a. a polyhydric alcohol component selected from: (i) sorbitol in an amount effective to provide in said frozen dessert the equivalent of about 14–18 percent by weight of a 70 percent by weight aqueous sorbitol solution, or (ii) a mixture of sorbitol and mannitol in an amount effective to provide in said frozen dessert the equivalent of about 5–15 percent by weight of a 70 percent by weight aqueous sorbitol solution and about 3–15 percent by weight mannitol, of which the amount of one of said polyhydric alcohols is at least 14 percent by weight;

b. about 2–5 percent by weight of anhydrous milk fat;

c. about 10–15 percent of non-fat milk solids;
   the balance being water and an effective amount of a low salt content, food quality stabilizer.

6. A dessert as in claim 5 wherein said stabilizer is a type which requires no emulsifier.

7. A dessert mix as in claim 5 wherein said stabilizer requires a separate emulsifier and an effective amount of low sodium content, food quality emulsifier is further provided in said mixture.

8. A dietary dairy dessert characterized by low fat, sodium and calorie content, comprising a pasteurized, homogenized and frozen mixture of:

a. a polyhydric alcohol component selected from: (i) sorbitol in an amount effective to provide in said frozen dessert the equivalent of about 14–18 percent by weight of a 70 percent by weight aqueous sorbitol solution, or (ii) a mixture of sorbitol and mannitol in an amount effective to provide in said frozen dessert the equivalent of about 5–15 percent by weight of a 70 percent by weight aqueous sorbitol solution and about 3–15 percent by weight mannitol, of which the amount of one of said polyhydric alcohols is at least 14 percent by weight;

b. about 2–5 percent by weight of anhydrous milk fat;

c. about 10–15 percent by weight of non-fat milk solids;

d. about 0.1–1.0 percent by weight of a low sodium content, food quality stabilizer;

e. about 0.1–1.0 percent by weight of a low sodium content, food quality emulsifier;
the balance being water.

9. A dessert as in claim 8 further including flavoring and a food color.

* * * * *